United States Patent [19]

Itoh et al.

[11] Patent Number: 4,726,060
[45] Date of Patent: Feb. 16, 1988

[54] LINE CIRCUIT FOR DRIVING A RINGER AND A SERVICE INDICATING LAMP IN A TELEPHONE SET

[75] Inventors: Masaki Itoh, Yokohama; Junichi Koike, Machida; Yoshishige Tanaka, Kawasaki, all of Japan

[73] Assignee: Fujitsu Limited, Kawasaki, Japan

[21] Appl. No.: 813,963

[22] Filed: Dec. 27, 1985

[30] Foreign Application Priority Data

Dec. 29, 1984 [JP] Japan .............................. 59-279915

[51] Int. Cl.[4] .......................................... H04M 3/02
[52] U.S. Cl. ................................. 379/376; 379/164; 379/166
[58] Field of Search ......... 179/51 AA, 70, 77, 99 LS, 179/99 LC, 84 L, 84 R, 18 HB, 84 C; 379/157, 164–166, 214–215, 376

[56] References Cited

U.S. PATENT DOCUMENTS

| 3,904,833 | 9/1975 | Beene et al. | 379/65 |
| 4,025,729 | 5/1977 | Stone | 379/418 |
| 4,140,882 | 2/1979 | Regan et al. | 379/201 |
| 4,298,774 | 11/1981 | Jusinskas, Jr. | 379/215 |
| 4,506,115 | 3/1985 | Schmitt | 379/376 |

Primary Examiner—Jin F. Ng
Assistant Examiner—Mark E. Ham
Attorney, Agent, or Firm—Staas & Halsey

[57] ABSTRACT

A line circuit for driving a ringer and a service indicating lamp in a telephone set, including a high frequency transformer ($T_2$), a switching circuit (22) for intermittently disconnecting a D.C. voltage applied to the primary winding of the transformer ($T_2$), and a control signal generating circuit (23). The control signal generating circuit generates a first control signal having high frequency and having a first duty ratio when the ringer is to be rung; and generates a second control signal having the same frequency but having a second duty ratio smaller than the first duty ratio when the service indicating lamp is to be lit. The first or the second control signal is applied to the switching circuit so that the high frequency transformer generates a ringing signal or a D.C. voltage to light the lamp. Since the high-frequency transformer is commonly used for generating the ringing signal and the D.C. voltage for the lamp, the line circuit can be made small and light.

7 Claims, 17 Drawing Figures

Fig. 3D 16KHz
DUTY 50% FOR RINGING

Fig. 3E 16KHz

Fig. 3F 16KHz
DUTY 6.25% FOR LAMP

Fig. 3G 16Hz

Fig. 3H 16Hz
16KHz: DUTY 50%

Fig. 3I    -----16KHz: DUTY 6.25%-----

Fig. 4

LINE CIRCUIT FOR DRIVING A RINGER AND A SERVICE INDICATING LAMP IN A TELEPHONE SET

BACKGROUND OF THE INVENTION

(1) Field of the Invention

The present invention relates to a line circuit for driving a ringer and a service indicating lamp in a telephone set. More particularly, it relates to a line circuit of a compact design employing a high-frequency transformer for supplying both a ringing signal and a lamp driving signal.

(2) Description of the Related Art

As an example of a service indicating function, the message waiting function is explained. By using a telephone set having the message function, when a called party is absent, a message lamp for message waiting function provided on the telephone set is lit to inform the later arriving party that someone has called him. For example, in a hotel, when a message is left at the front desk during the absence of a guest and this message should be conveyed to the guest when he returns to his room, a switch provided on the front desk is operated so that the message lamp of the telephone set in the guest room is lit, informing him that a message has been left at the front desk. By this, the guest can know that there is a message for him. The lamp can be lit not only by the switching operation at the front desk but also by dialing a special number from another telephone set, an exchange in the hotel decoding the special number so as to light the message lamp.

To light the message lamp, a direct-current (D.C.) voltage of, for example, 100 V must be applied through a subscriber line to the message lamp.

Apart from the message lamp, in a two-wire subscriber line, to ring the ringer in the telephone set when a call is received, a low-frequency ringing signal of, for example, 16 Hz is sent from a line circuit to the subscriber line. The root mean square value of the ringing signal is, for example, 75 V.

Conventionally, there are three power supplies, i.e., a first power supply for supplying a voltage of, for example, −48 V, for communication to the subscriber line, a second power supply for supplying a ringing signal to the ringer, and a third power supply for supplying a message signal to the message lamp.

Further, to generate the low-frequency ringing signal having a root mean square value of 75 V as an example, a low-frequency transformer, which is large in size and heavy due to the low frequency, is conventionally employed.

To generate the message signal of D.C. voltage, a separate rectifier circuit is conventionally employed by which a commercial alternating current is rectified to obtain a D.C. voltage of, for example, 100 V. This increases the number of parts.

Therefore, the conventional line circuit, if it includes a ringer driving circuit and a lamp driving circuit, has disadvantages of large size and heavy weight, causing problems in installation.

SUMMARY OF THE INVENTION

Accordingly, an object of the present invention is to provide a line circuit for driving a ringer and a service indicating lamp in a telephone set, in which a power supply circuit is commonly used for driving both the ringer and the service indicating lamp so as to reduce the device size.

Another object of the present invention is to provide the above-mentioned line circuit in which, based on the idea of employing a switching regulator for D.C.—D.C. conversion in the power supply circuit, the size and the weight of the line circuit are reduced so as to eliminate the installation problem.

According to the present invention, there is provided a line circuit connected between a speech path switch and a telephone set, the telephone set having a ringer and a service indicating lamp (6) commonly connected to a subscriber line connected to the line circuit, including: a servicing power supply circuit, operatively connected to the telephone set, for generating a ringer driving signal for driving the ringer and a lamp driving signal for driving the service indicating lamp, the servicing power supply circuit including: a transformer having a primary winding and a secondary winding; a D.C. power supply operatively connected to the primary winding, for generating a D.C. voltage; a smoothing circuit connected between the secondary winding and the subscriber line, for smoothing signals at the secondary winding; a switching circuit operatively connected to the first winding for intermittently disconnecting the current path of the D.C. power supply; and a control signal generating circuit operatively connected to the switching circuit, for generating a first control signal having a first frequency and having a first duty ratio, and a second control signal having the same frequency but having a second duty ratio different from the first duty ratio; the first control signal being applied to the switching circuit when the ringer is to be rung, the D.C. voltage being transformed to the ringer driving signal through the transformer and the smoothing circuit in response to the first control signal; the second control signal being applied to the switching circuit when the service indicating lamp is to be lit, the D.C. voltage being transformed to the lamp driving signal through the transformer and the smoothing circuit in response to the second control signal; whereby the secondary winding of the transformer generates different voltages in response to the first control signal and the second control signal, respectively.

BRIEF DESCRIPTION OF THE DRAWINGS

The above objects and features of the present invention will be more apparent from the following description of the preferred embodiments with reference to the attached drawings, wherein.

DESCRIPTION OF THE PREFERRED EMBODIMENTS

Before describing the preferred embodiments, a conventional line circuit will first be described with reference to FIG. 1.

Figure 1:
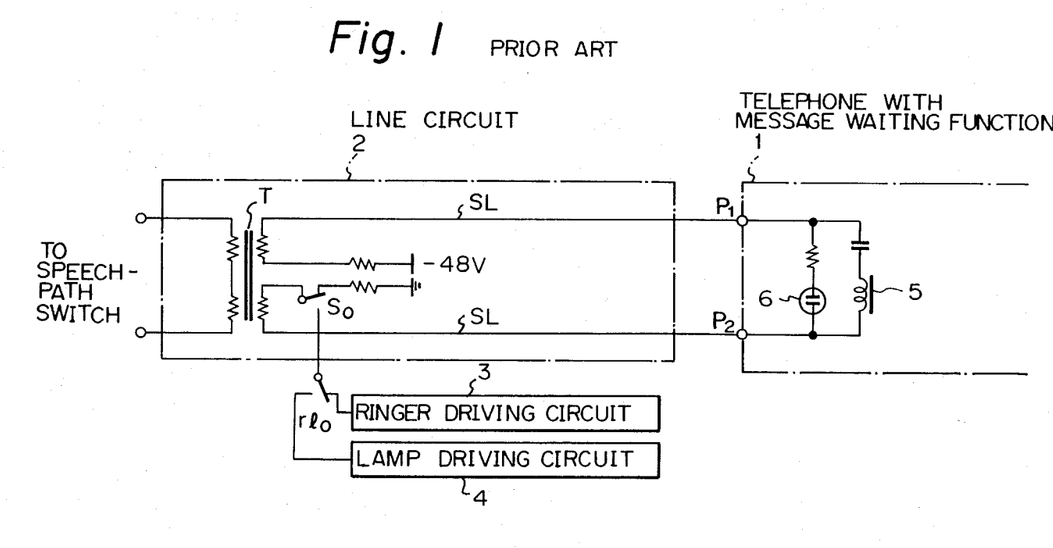
FIG. 1 is a circuit diagram of a conventional line circuit.

In FIG. 1, a telephone set 1 having a message function is connected through a line circuit 2 to a speech-path switch in an exchange. In the line circuit 2, speechsound signals transferred from the speech-path switch are sent through a transformer T and subscriber lines SL to be applied to terminals $P_1$ and $P_2$ of the telephone set 1. A power supply voltage of, for example, $-48$ V, used for communication, is applied to the secondary winding of the transformer T. Between the power supply of $-48$ V and the secondary winding, a switch $S_0$ is provided. The line circuit 2 is connected to a ringer driving circuit 3 and a lamp driving circuit 4. Since the conventional ringer driving circuit 3 and the lamp driving circuit 4 have large sizes and are heavy, they are usually provided separate from the package of the line circuit 2. The telephone set 1 includes a ringer 5 and a message lamp 6. When the ringer 5 is to be rung, the ringer driving circuit 3 is connected through a relay switch $rl_0$ and the switch $S_0$ to the secondary winding of the transformer T. When the message lamp 6 is to be lit, the lamp driving circuit 4 is connected through the relay switch $rl_0$ and the switch $S_0$ to the secondary winding of the transformer T. The ringer driving circuit 3 generates a ringing signal having a frequency of 16 Hz and having a root mean square value of 75 V, (75 Vrms), as an example. The lamp driving signal generates a D.C. 100 V signal.

The ringer driving circuit 3 includes an oscillator for generating an A.C. current of 16 Hz and an additional transformer for generating a 16 Hz signal having 75 Vrms. By switching the internal power supply voltage of $-48$ V, applied to the primary winding of the additional transformer, with the A.C. current of 16 Hz from the oscillator, a 16 Hz signal having 75 Vrms is obtained at the secondary winding of the additional transformer.

The lamp driving circuit 4 includes a rectifying circuit for rectifying the commercial A.C. voltage into D.C. 100 V to be applied to the message lamp.

The disadvantages of the conventional line circuit 2 are as follows.

First, since the additional transformer in the ringer driving circuit 3 is used at such a low frequency of 16 Hz, the size and weight of the additional transformer are very large so that the line circuit 2 becomes very large and heavy if it includes the ringer driving circuit 3 and the lamp driving circuit 4, causing an installation problem.

Second, since the lamp driving circuit employs the rectifying circuit for rectifying the commercial A.C. voltage, the size and weight of the device are further increased.

Third, since the power supply circuit for driving the ringer and the power supply circuit for driving the lamp are separately provided, the size and weight of the device are still further increased.

Now, preferred embodiments of the present invention will be described.

Figure 2:
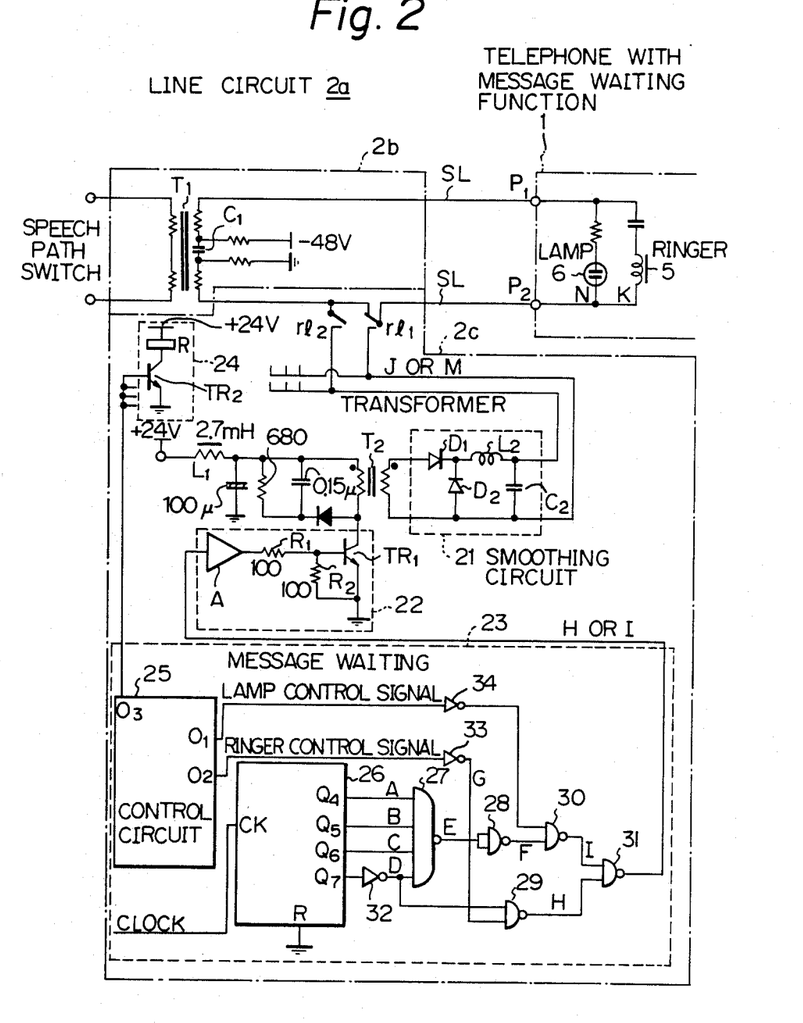
FIG. 2 is a circuit diagram of a line circuit according to an embodiment of the present invention.

FIG. 2 is a circuit diagram of a line circuit according to an embodiment of the present invention. In FIG. 2, a line circuit 2a is connected between a speech path switch and a telephone set 1. The telephone set 1 in FIG. 2 is the same as the telephone set 1 in FIG. 1 and includes the ringer 5 and the message lamp 6. The line circuit 2a includes a speech current supplying circuit 2b and a servicing power supply circuit 2c.

The speech current supplying circuit 2b includes a first transformer $T_1$ having a primary winding connected to the speech path switch and having a secondary winding connected, through relay switches $rl_1$ and $rl_2$ and the subscriber lines SL, to the terminals $P_1$ and $P_2$ of the telephone. The direct current through the secondary winding is disconnected by a capacitor $C_1$. One end of the capacitor $C_1$ is connected to a power supply of $-48$ V. The other end of the capacitor $C_1$ is connected to ground.

The servicing power supply circuit 2C includes a second transformer $T_2$ having a primary winding and a secondary winding, a D.C. power supply of $+24$ V connected through an inductor $L_1$ of 2.7 mH to the primary winding of the transformer $T_2$, a smoothing circuit 21 connected between the secondary winding of the transformer $T_2$ and the relay switches $rl_1$ and $rl_2$, a switching circuit 22 connected to the primary winding of the transformer $T_2$, a control signal generating circuit 23 connected to the switching circuit 22, and a relay driving circuit 24.

The smoothing circuit 21 includes diodes $D_1$ and $D_2$, an inductor $L_2$, and a capacitor $C_2$.

The switching circuit 22 includes an NPN transistor $TR_1$ having a collector connected to the primary winding of the transformer $T_2$, a base operatively receiving, through an amplifier A and a resistor $R_1$ of 100 $\Omega$, a control signal H or I which is output from the control signal generating circuit 23, and an emitter connected to ground. The base and the emitter of the transistor $TR_1$ are connected through a biasing resistor $R_2$ of 100$\Omega$.

The control signal generating circuit 23 includes a control circuit 25, a counter 26, NAND gates 27 through 31, and inverter gates 32 through 34.

The control circuit 25 generates at its output $O_1$, $O_2$, and $O_3$, a message lamp control signal, a ringer control signal, and a relay control signal, respectively.

The counter 26 receives an internal clock signal having a frequency of, for example, 2.048 MHz, and divides the frequency of the clock signal into subfrequencies of $2.048 \text{ MHz}/2^4$, $2.048 \text{ MHz}/2^5$, $2.048 \text{ MHz}/2^6$, and $2.048 \text{ MHz}/2^7$ which are output at terminals $Q_4$, $Q_5$, $Q_6$, and $Q_7$, respectively.

When the relay R is not activated so that the relay switches $rl_1$ and $rl_2$ are OFF as illustrated, a direct current is supplied from the D.C. power supply of $-48$ V through subscriber line SL to the telephone set 1 having the message waiting function.

In response to the ringer control signal output from the terminal $O_2$ of the control circuit 25, a first control signal H is generated from the control signal generating circuit 23. In response to the message lamp control signal output from the terminal $O_1$ of the control circuit 25, a second control signal I is generated from the control signal generating circuit 23.

The generation of the first or the second control signal is described in more detail with reference to FIGS. 3A through 3M.

Figure 3A:
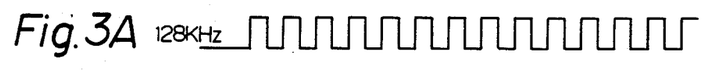
FIGS. 3A through 3N are waveform diagrams at various points in the line circuit shown in FIG. 2.
Figure 3B:
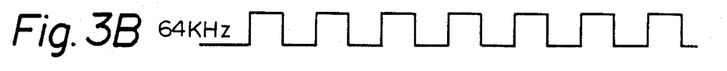
Figure 3C:
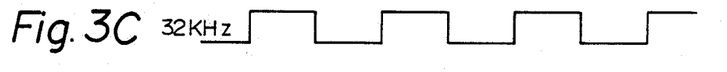
Figure 3D:
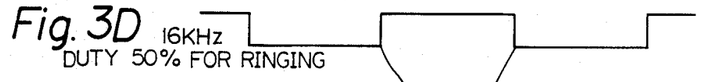

FIGS. 3A through 3C show the waveforms of the divided signals A, B, and C of $2.048 \text{ MHz}/2^4 = 128$ kHz, $2.048 \text{ MHz}/2^5 = 64$ kHz, and $2.048 \text{ MHz}/2^6 = 32$ kHz output from the terminals $Q_4$, $Q_5$, and $Q_6$ of the counter 26, respectively. FIG. 3D shows the waveform of the inverted signal of the divided signal having the frequency of $2.048 \text{ MHz}/2^7$. That is, the signal shown in FIG. 3D is the inverted signal of the signal output from the terminal $Q_7$ inverted by the inverter 32. In the following, the signal in FIG. 3D is referred to as a first control signal D. The first control signal D has the frequency of 16 kHz and has a duty ratio of 50%.

Figure 3E:
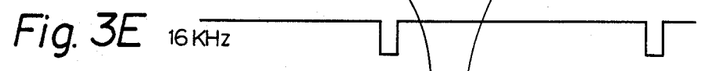
Figure 3F:
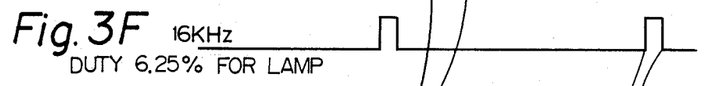

The signals A, B, C, and D are gated through the NAND gate 27, resulting, at its output, in a signal E as shown in FIG. 3E. The signal E is inverted through the NAND gate 28 so that a signal F as shown in FIG. 3F is obtained. The signal F shown in FIG. 3F is hereinafter referred to as a second control signal. The second control signal F has a frequency of 16 kHz, which is the same as the first control signal D, but has a duty ratio of 6.25%. This will be understood as because of the gating of the signals A, B, C, and D through the NAND gate 27.

Operation to Ring the Ringer

Figure 3G:
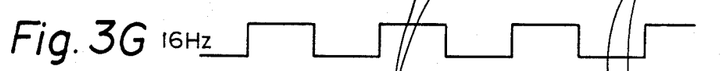
Figure 3H:
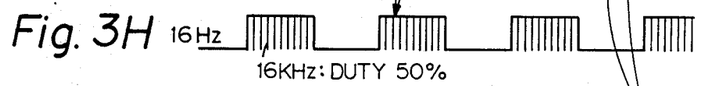

When the ringer 5 is to be rung, the control circuit 25 outputs a ringer control signal having a low frequency of, for example, 16 Hz. The ringer control signal is inverted by the inverter 33. The inverted ringer control signal is shown in FIG. 3G. The inverted ringer control signal shown in FIG. 3G and the first control signal D shown in FIG. 3D are gated through the NAND gate 29. Thus, at the output of the NAND gate 29, an intermittent signal H shown in FIG. 3H is obtained. The intermittent signal H is a superimposed signal of the first control signal D and the ringer control signal G. The superimposed signal has the high frequency of 16 kHz and has a duty ratio of 50% but is intermittent together with the low frequency of 16 Hz. That is, the high level of the low-frequency signal, i.e., 16 Hz, consists of the high-frequency signal, i.e., 16 kHz having the duty ratio of 50%.

The superimposed signal H is applied through the NAND gate 31 and through the amplifier A and the resistor $R_1$ in the switching circuit to the base of the switching transistor $TR_1$. The transistor $TR_1$ then conducts an intermittent current from the power supply of $+24$ V through the inductor $L_1$, the primary winding of the transformer $T_2$, and the transistor $TR_1$ to the ground. The intermittent current is determined by the superimposed signal H. That is, the current passing through the transistor $TR_1$ has a rectangular waveform of low frequency of 16 Hz, in which each high level of 16 Hz consists of high-frequency signals of 16 kHz.

Figure 3I:
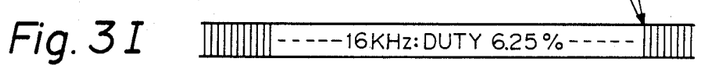
Figure 3J:
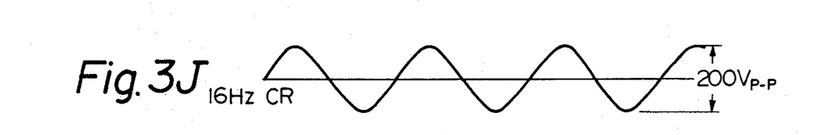

Since the current supplied to the primary winding of the transformer $T_2$ includes the high frequency of 16 kHz, the transformer $T_2$ can be made a small high-frequency transformer. This is a main advantage of the present invention. The transformer $T_2$ converts the D.C. voltage of 24 V into a high voltage of, for example, 200 V peak to peak, which is sufficient to ring the ringer. This conversion is effected by the function of a switching regulator utilizing the high frequency of 16 kHz. The high frequency component of 16 kHz of the induced signal at the secondary winding of the transformer $T_2$ is smoothed by the smoothing circuit 21. Thus, at the output of the smoothing circuit 21, a 16 Hz signal J having a peak-to-peak voltage of 200 V is obtained, as shown in FIG. 3J. The 16 Hz signal J is the continuous ringing signal CR which is supplied to the relay switches $rl_1$ and $rl_2$.

Figure 3K:
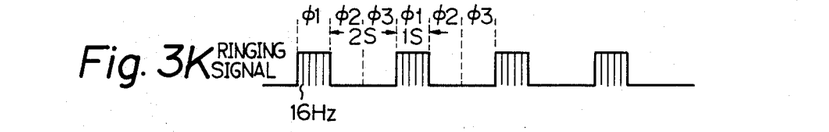

Simultaneous with the output of the ringer control signal, the control circuit 25 outputs a relay driving signal from the output terminal $O_3$. The relay driving signal is applied to the base of the transistor $TR_2$, so that the relay R is driven. The relay driving signal is an intermittent signal consisting of a high level of, for example, one second and a subsequent low level of, for example, two seconds. Accordingly, the relay switches $rl_1$ and $rl_2$ are turned ON for one second and then are turned OFF for two seconds. Thus, a ringing signal K shown in FIG. 3K is supplied through the relay switches $rl_1$ and $rl_2$ and the transformer $T_1$ to the telephone set 1 to intermittently ring the ringer 5. The ringing signal K has a 16 Hz signal for one second and a subsequent low level for two seconds.

Figure 3L:
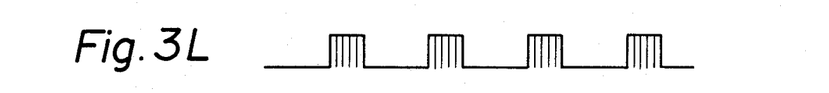
Figure 3M:
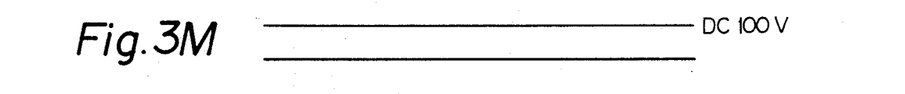
Figure 3N:
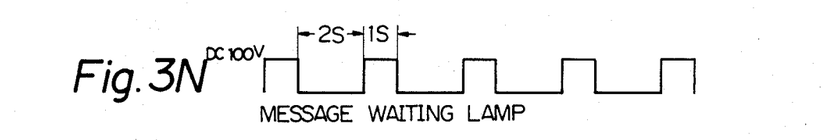

In a practical example, there are another seven telephone sets (not shown) connected through seven relay switches (not shown) to the output of the smoothing circuit. Also, there are another seven relay driving circuits (not shown) corresponding to the above-mentioned seven relay switches. The control circuit 25 determines which of these relay driving circuits should be activated. That is, a total of eight telephone sets are connected to one line circuit. In the ringing signal shown in FIG. 3K, there are three phases $\phi_1$, $\phi_2$, and $\phi_3$ in one cycle. The first phase $\phi_1$ is used for ringing the ringer in one of four telephone sets among the above-mentioned eight telephone sets. The second phase $\phi_2$ is used for ringing the ringer in one of the remaining four telephone sets in the eight telephone sets. FIG. 3L shows the ringing signal formed by the second phase $\phi_2$. The third phase $\phi_3$ is commonly used for lighting the message lamp in one of the eight telephone sets, as shown in FIG. 3N.

Operation to Light the Lamp

When the message lamp 6, such as a neon lamp, is to be lit, the control circuit 25 outputs the lamp control signal from the output terminal $O_1$. The lamp control signal is a continuously high level signal. In response to the message signal, the second control signal F shown in FIG. 3F having the high frequency of 16 kHz but having a small duty ratio of 6.25% is gated through NAND gate 30. The second control signal F is then gated through the NAND gate 31 so that the second control signal is obtained as a signal I at the output of the NAND gate 31, as shown in FIG. 3I. The signal I is the same as the second control signal F.

Thus, the second control signal I is supplied to the base of the transistor $TR_1$ so that the transformer $T_2$ converts, by the function of the switching regulator, the D.C. voltage of $+24$ V into a high voltage of, for example, 100 V, necessary to light the lamp 6 but insufficient to ring the ringer 5. The message lamp 6 is lit by a D.C. voltage between 90 V and 130 V. Since the duty ratio of the second control signal F is 6.25%, which is smaller than the duty ratio of 50% in the first control signal D, the appropriate voltage of 100 V, which is lower than the 200 V peak-to-peak voltage for ringing the ringer 5, can be obtained. The high voltage of 100 V is then smoothed by the smoothing circuit 21 so that the A.C. components are eliminated, as shown in FIG. 3M. The relay switches, $rl_1$ and $rl_2$ operate in the same way as in the operation to ring the ringer 5. Thus, a message lamp signal N is supplied to the message lamp 6 to light it.

Since no separate rectifier circuit is necessary to obtain the D.C. voltage for driving the lamp, the line circuit can be made compact.

Figure 4:
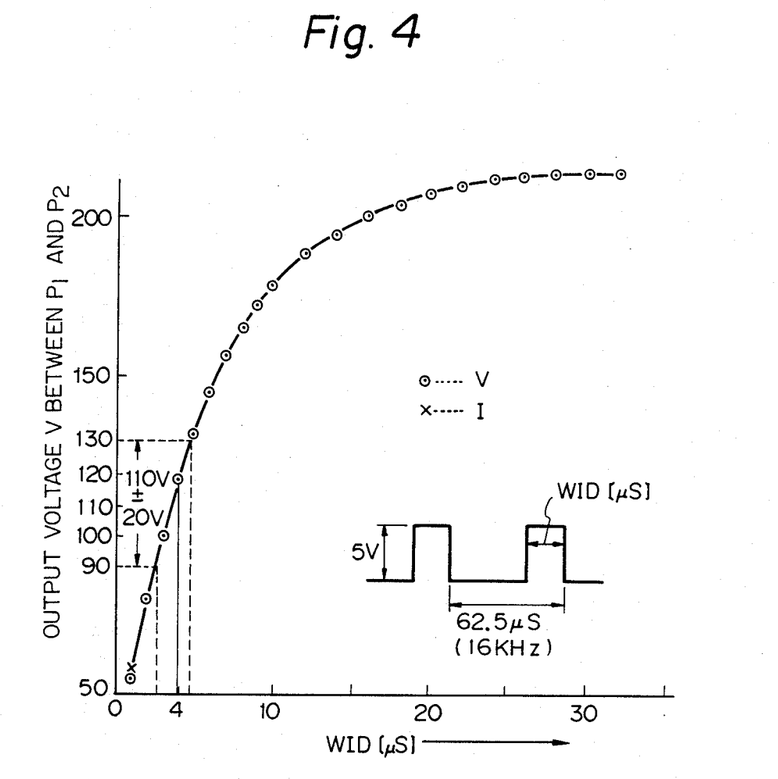
FIG. 4 is a graph of experimental results of the relation between the voltage applied to a message lamp and the pulse width of an input 16 kHz switching signal.

The duty ratio of the second control frequency F may not always be 6.25% but may be changed within a certain range. This will be clearer from the following description with reference to FIG. 4, which shows an experimental result of a relation between the voltage applied to the message lamp and the pulse width of the second control signal. In FIG. 4, the vertical axis represents a voltage applied to the terminals $P_1$ and $P_2$ of the telephone set 1; and the horizontal axis represents the pulse width WID of the second control signal F. The second control signal has the frequency of 16 kHz as mentioned before. Therefore, one cycle of the second control signal F is 62.5 $\mu$s. When the pulse width WID is 4 μs, the duty ratio is 6.4%. The experimental result shows that the voltage applied to the terminals $P_1$ and $P_2$ is 120 V when the pulse width WID is 4 μs. The message waiting lamp 6 can be lit by the voltage between 90 V and 130 V. Therefore, the pulse width WID may be selected within a range between 4 μs+α and 4 μs-β, where α and β are experimentally determined in such a way that the maximum voltage and the minimum voltage applied to the lamp 6 are determined as 130 V and 90 V, respectively.

When the pulse width WID is increased, the voltage is also increased to approach 200 V as by the first control signal D of duty 50%.

The present invention is not restricted to the above-described embodiment. Various changes and modifications are possible without departing from the scope of the invention. For example, the frequency of the first control signal and the second control signal may be any frequency as long as it is sufficiently high to operate the transformer $T_2$ as a switching regulator. Further, the frequency of the ringer control signal may also be any frequency as long as it can ring the ringer 5.

From the foregoing description, it will be apparent that, according to the present invention, by employing a high-frequency transformer as a switching regulator for obtaining a ringing signal, and since the high-frequency transformer is small in size and light in weight in comparison with a conventionally employed low-frequency transformer, the size and weight of a line circuit having a function to drive a ringer and a service indicating lamp can be made small.

In addition, since the same high-frequency transformer is also used for obtaining a lamp driving signal, the conventionally employed separate rectifier can be eliminated. This also leads to a smaller size and smaller weight of the line circuit.

Recently, four-wire multifunctioning telephone sets such as key telephone sets which can provide various services other than the speech service have been developed. Such a multifunctioning telephone set includes an oscillator as a ringer. Therefore, to such a multifunctioning telephone set, it is not necessary to send the 16 Hz ringing signal. When such four-wire telephone sets and the two-wire telephone sets as in the present invention have to be incorporated into a hybrid exchange system, the line circuit package for the two-wire system must be compact so as to be easily replaced by the line circuit package for the four-wire system. Thus, the line circuit of small size and small weight according to the present invention is particularly advantageous in the hybrid system.

We claim:

1. A line circuit connected between a speech path switch and a telephone set having a ringer and a service indicating lamp commonly connected to a subscriber line which is connected to said line circuit, comprising:
   a servicing power supply circuit, operatively connected to said telephone set, for generating a ringer driving signal for driving the ringer, and a lamp driving signal for driving the service indicating lamp, said servicing power supply circuit including:
   a transformer having a primary winding and a secondary winding;
   a direct-current power supply, operatively connected to the primary winding and havng a current path connected to a reference potential, for generating a direct-current voltage;
   a smoothing circuit, connected between the secondary winding and the subscriber line, for smoothing signals at the secondary winding;
   first and second relays coupled between the subscriber line and said smoothing circuit; and
   a switching circuit, operative connected to the primary winding, for intermittently disconnecting the current path of said direct-current power supply from the reference potential;
   a control signal generating circuit, operatively connected to said switching circuit, for generating a first clocking signal having a first frequency and having a first duty ratio, and for generating a second clocking signal having the first frequency and having a second duty ratio different from the first duty ratio;
   the first clocking signal being applied to said switching circuit when the ringer is to be rung, causing the direct-current voltage to be applied to said transformer, said smoothing circuit and said first and second relays, generating the ringer driving signal;
   the second control signal begin applied to the switching circuit when the service indicating lamp is to be lit, causing the direct-current voltage being applied to said transformer, said smoothing circuit and said first and second relays, generating said lamping driving signal;
   so that the secondary winding of the transformer generates different voltages in response to the first clocking signal and the second clocking signal, respectively.

2. A line circuit as set forth in claim 1, wherein:
   the first clocking signal having the first frequency and having the first duty ratio is made discontinuous intermittently together with a second frequency lower than the first frequency and is applied to said switching circuit, so that said smoothing circuit outputs an alternating signal having the second frequency when the ringer is to be rung; and
   the second clocking signal, having the first frequency but having the second duty ratio, is continuously applied to said switching circuit, whereby said smoothing circuit outputs a direct-current voltage when the service indicating lamp is to be lit.

3. A line circuit as set forth in claim 1, wherein said control signal generating circuit comprises:
   a control circuit for generating a ringer control signal and a lamp control signal;
   a first gate circuit having inputs operatively connected to receive the first clocking signal and the ringer control signal and having an output connected to said switching circuit; and
   a second gate circuit having inputs operatively connected to receive the second clocking signal and the lamp control signal and having an output connected to said switching circuit;
   the ringer control signal being generated when the ringer is to be rung,
   the ringer control signal having a second frequency lower than the first frequency,
   the lamp control signal being generated when the service indicating lamp is to be lit,
   the lamp control signal being a direct-current signal,
   so that said first gate circuit operatively outputs a first superimposed signal made up of the first clocking signal and the ringer control signal, and said second gate circuit operatively outputs a second superimposed signal made up of the second clocking signal and said lamp control signal, said second superimposed signal being continuous and having said first frequency and said second duty ratio.

4. A line circuit as set forth in claim 3, wherein said switching circuit comprises a transistor having a collector connected to the primary winding of said transformer, a base connected to receive the first superimposed signal and the second superimposed signal, and an emitter connected to ground.

5. A line circuit as set forth in claim 3 and further including a means for generating a clock signal, wherein said control signal generating circuit further comprises:
- a counter having an input and a plurality of outputs, said counter dividing a clock signal, generated by said clock signal generating means and applied to the input, into a plurality of subfrequencies;
- a third gate circuit, operatively connected to one of the outputs of said counter, for outputting the first control signal; and
- a fourth gate circuit, operatively connected to the other said outputs of said counter, for outputting the second control signal.

6. A line circuit as set forth in claim 1, wherein:
said control signal generating circuit includes means for generating a ringer control signal having a second frequency lower than the first frequency, said control signal generating circuit outputting a superimposed signal made up of the first clocking signal and the ringer control signal, the superimposed signal being applied to said switching circuit, so that said smoothing circuit outputs an AC ringer driving signal having the second frequency; and
the second clocking signal is continuously applied to said switching circuit so that said smoothing circuit outputs a DC voltage used as the lamp driving signal.

7. A circuit connected between a speech path switch and a telephone set having a ringer and a service indicating lamp commonly connected to a subscriber line which is connected to said circuit, comprising:
- a power supply circuit connected to said telephone set, said power supply circuit including:
  - a transformer;
  - a power supply connected to said transformer and having a current path connected to a reference potential;
  - a switching circuit, connected to said transformer, for intermittently disconnecting the current path of said power supply from the reference potential; and
- a control signal generating circuit, connected to said switching circuit, for generating a first clocking signal having a first frequency and having a first duty ratio, and for generating a second clocking signal having the first frequency and having a second duty ratio different from the first duty ratio, the first clocking signal being applied to said switching circuit when the ringer is to be rung, and the second clocking signal being applied to said switching circuit when the service indicating lamp is to be lit.

* * * * *